(12) United States Patent
Wolf et al.

(10) Patent No.: US 12,567,321 B2
(45) Date of Patent: Mar. 3, 2026

(54) TESTING A HEAT DETECTOR OF A SELF-TESTING HAZARD SENSING DEVICE

(71) Applicant: Honeywell International Inc., Charlotte, NC (US)

(72) Inventors: Benjamin H. Wolf, Leicester (GB); Christopher Dearden, Melton Mowbray (GB); Michael Barson, Nuneaton (GB)

(73) Assignee: Honeywell International Inc., Charlotte, NC (US)

( * ) Notice: Subject to any disclaimer, the term of this patent is extended or adjusted under 35 U.S.C. 154(b) by 644 days.

(21) Appl. No.: 17/674,318

(22) Filed: Feb. 17, 2022

(65) Prior Publication Data

US 2023/0260390 A1 Aug. 17, 2023

(51) Int. Cl.
| | |
|---|---|
| *G08B 29/14* | (2006.01) |
| *G01K 7/22* | (2006.01) |
| *G01K 15/00* | (2006.01) |

(52) U.S. Cl.
CPC ............. G08B 29/145 (2013.01); G01K 7/22 (2013.01); G01K 15/007 (2013.01)

(58) Field of Classification Search
CPC .... G08B 29/145; G08B 17/107; G08B 29/20; G08B 17/06; G01K 15/007; G01K 7/22; G01K 15/005
See application file for complete search history.

(56) References Cited

U.S. PATENT DOCUMENTS

| | | | |
|---|---|---|---|
| 5,644,071 A | 7/1997 | Wagner | |
| 6,161,958 A * | 12/2000 | Rattman | G08B 29/043 |
| | | | 327/512 |
| 6,288,638 B1 * | 9/2001 | Tanguay | G08B 21/20 |
| | | | 340/584 |
| 6,508,584 B2 | 1/2003 | Blankenagel | |
| 11,024,154 B1 | 6/2021 | Lang et al. | |
| 11,127,284 B1 | 9/2021 | Barson et al. | |
| 11,132,891 B2 | 9/2021 | Dearden et al. | |
| 11,151,851 B1 * | 10/2021 | Moix Olive | G08B 17/06 |
| 11,227,473 B1 | 1/2022 | Griffith et al. | |

(Continued)

FOREIGN PATENT DOCUMENTS

| | | | |
|---|---|---|---|
| CN | 105823576 A | 8/2016 | |
| CN | 106530578 A * | 3/2017 | G08B 17/06 |

(Continued)

*Primary Examiner* — Laura Martin
*Assistant Examiner* — Julia Fitzpatrick
(74) *Attorney, Agent, or Firm* — Brooks, Cameron & Huebsch, PLLC

(57) ABSTRACT

Devices, methods, and systems for testing a heat detector of a self-testing hazard sensing device are described herein. One device includes a heat detector, and a controller configured to provide energy to the heat detector to heat the heat detector to a threshold temperature, determine an amount of time it takes for the heat detector to heat to the threshold temperature, determine whether the amount of time it takes for the heat detector to heat to the threshold temperature meets or exceeds a threshold amount of time, and determine whether the heat detector is functioning properly based on whether the amount of time it takes for the heat detector to heat to the threshold temperature meets or exceeds the threshold amount of time.

15 Claims, 5 Drawing Sheets

(56) References Cited

U.S. PATENT DOCUMENTS

| 2020/0402380 | A1* | 12/2020 | Barson | G08B 17/06 |
| 2021/0182236 | A1* | 6/2021 | Moseman | H04L 69/12 |
| 2021/0347106 | A1* | 11/2021 | Morris | G01K 1/026 |
| 2022/0058929 | A1 | 2/2022 | Dearden et al. | |
| 2024/0264007 | A1* | 8/2024 | Bambila | G01K 7/183 |

FOREIGN PATENT DOCUMENTS

| EP | 2593762 | B1 | 6/2016 |
| EP | 2665993 | B1 | 4/2019 |
| KR | 101823543 | B1 | 1/2018 |

* cited by examiner

TESTING A HEAT DETECTOR OF A SELF-TESTING HAZARD SENSING DEVICE

TECHNICAL FIELD

The present disclosure relates generally to devices, methods, and systems for testing a heat detector of a self-testing hazard sensing device.

BACKGROUND

Large facilities (e.g., buildings), such as commercial facilities, office buildings, hospitals, and the like, may have a fire alarm system that can be triggered during an emergency situation (e.g., a fire) to warn occupants to evacuate. For example, a fire alarm system may include a fire control panel and a plurality of hazard (e.g., fire) sensing devices (e.g., smoke detectors), located throughout the facility (e.g., on different floors and/or in different rooms of the facility) that can sense a fire occurring in the facility and provide a notification of the fire to the occupants of the facility via alarms.

In some instances, the sensing devices may need to be placed in harsh environments, such as, for instance, commercial kitchens, in which they may be prone to becoming covered in grease or other such clogging debris, which can impede the performance of the sensing device. For example, a barrier may be formed between a heat source and the heat detector (e.g., heat sensor) of the sensing device, which can cause the sensing device to respond to the heat slower than it should, or even to not respond at all.

Maintaining the fire alarm system can include regular testing of fire sensing devices mandated by codes of practice in an attempt to ensure that the fire sensing devices are functioning properly. A typical test to ensure that a heat sensor of a fire sensing device is functioning properly can include a maintenance engineer or technician visually inspecting the heat sensor, and/or using a heat gun to raise the temperature of the heat sensor in the fire sensing device.

However, this process of visually inspecting and/or manually testing each fire sensing device can be time consuming, expensive, and disruptive to a business. Further, such visual inspections and/or manual tests may not provide an accurate indication of whether the heat sensor is functioning properly. For example, merely determining whether the heat sensor responds to heat from a heat gun may not provide an accurate indication of whether the heat sensor is covered or blocked by debris.

DETAILED DESCRIPTION

Figure 1:
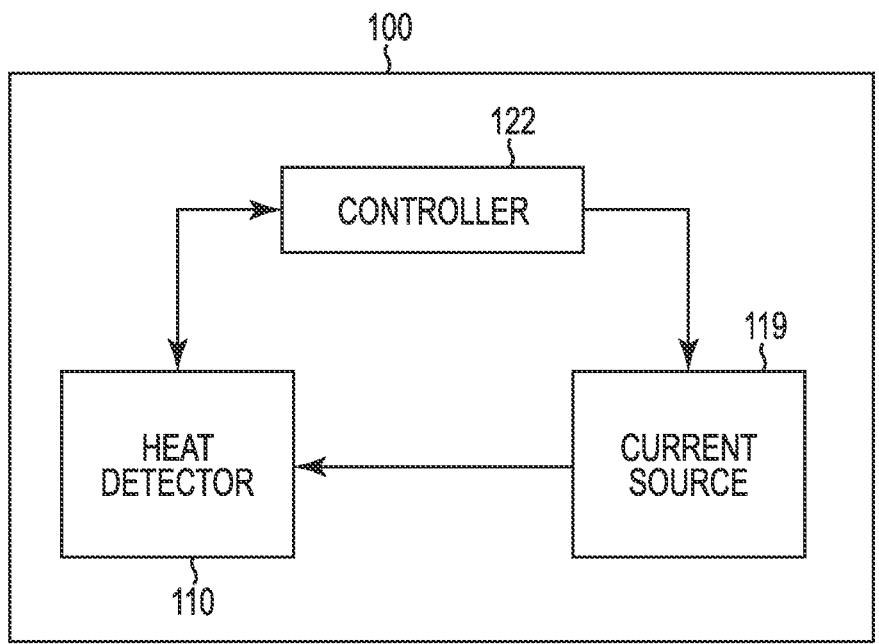
FIG. 1 illustrates a block diagram of a self-testing hazard sensing device in accordance with an embodiment of the present disclosure.

Devices, methods, and systems for testing a heat detector of a self-testing hazard sensing device are described herein.

One device includes a heat detector, and a controller configured to provide energy to the heat detector to heat the heat detector to a threshold temperature, determine an amount of time it takes for the heat detector to heat to the threshold temperature, determine whether the amount of time it takes for the heat detector to heat to the threshold temperature meets or exceeds a threshold amount of time, and determine whether the heat detector is functioning properly based on whether the amount of time it takes for the heat detector to heat to the threshold temperature meets or exceeds the threshold amount of time.

In contrast to previous hazard (e.g., fire) sensing devices in which a maintenance engineer or technician would have to manually test and/or recalibrate each fire sensing device in a facility (e.g., via a visual inspection and/or by using a heat gun) to determine whether the device is functioning properly, hazard (e.g., fire) sensing devices in accordance with the present disclosure can test and/or recalibrate themselves. Accordingly, fire sensing devices in accordance with the present disclosure may take significantly less time, effort, and/or expense to test to determine whether they are functioning properly, can be tested and/or recalibrated continuously and/or on demand, and can more accurately determine the ability of the fire sensing device to detect an actual fire. As such, self-testing fire sensing devices may have extended service lives and be replaced less often resulting in a positive environmental impact.

For example, fire sensing devices in accordance with the present disclosure can determine whether their heat detector (e.g., heat sensor) is functioning properly based on the amount of time it takes for the heat detector to heat up or cool down, rather than merely determining whether the heat detector responds to heat. Accordingly, fire sensing devices in accordance with the present disclosure can provide a more accurate indication of whether their heat sensor is functioning properly (e.g., whether their heat sensor is covered or blocked by debris) than previous fire sensing devices.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 122 may reference element "22" in FIG. 1, and a similar element may be referenced as 322 in FIG. 3.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 illustrates a block diagram of a self-testing hazard sensing device 100 in accordance with an embodiment of the present disclosure. As used herein, the term "hazard sensing device" may include and/or refer to, for instance, a fire and/or carbon monoxide sensing device.

As shown in FIG. 1, hazard sensing device 100 can include a heat detector (e.g., heat sensor) 110. Heat detector 110 can be and/or include, for example, a thermistor. Hazard sensing device 100 can use heat detector 110 to detect a fire, as will be further described herein (e.g., in connection with FIG. 4).

As shown in FIG. 1, hazard sensing device 100 can include a controller 122 coupled to heat detector 110. Controller 122 can be, for example, a microcontroller that includes a memory and a processor, as will be further described herein (e.g., in connection with FIG. 3). Controller 122 can execute the self-test functionality of hazard sensing device 100.

For example, during a self-test function being performed by hazard sensing device 100, controller 122 can provide energy (e.g., current) to heat detector 110 to heat (e.g., increase the temperature of) the heat detector to a threshold temperature. The threshold temperature can be, for instance, a temperature sufficient to trigger a fire response from a properly functioning hazard sensing device (e.g., a hazard sensing device with a properly functioning heat detector 110).

In the embodiment illustrated in FIG. 1, hazard sensing device 100 includes an internal current source 119, which can be used (e.g., operated) by controller 122 to provide the energy to heat detector 110. Current source 119 can be, for instance, an internal power supply, such as a battery, of hazard sensing device 100. In some embodiments, controller 122 can use an external current source (not shown for clarity and so as not to obscure embodiments of the present disclosure) of hazard sensing device 100 to provide the energy to heat detector 110. The external current source can be, for instance, the wiring and/or power supply of the facility in which hazard sensing device 100 is installed. The internal and/or external power supply can be, for example, a 3.5 Watt power supply. However, embodiments of the present disclosure are not limited to a particular type or amount of power supply or current source.

Controller 122 can determine (e.g., measure) the amount of time it takes for heat detector 110 to heat to the threshold temperature (e.g., the amount of time it takes for the temperature of heat detector 110 to increase to the threshold temperature) while the energy is being provided to heat detector 110. Controller 122 can use this amount of time to determine whether heat detector 110 is functioning properly (e.g., whether heat detector 110 needs maintenance and/or needs to be replaced).

For example, controller 122 can determine whether the amount of time it takes for heat detector 110 to heat to the threshold temperature meets or exceeds a threshold amount of time (e.g., by comparing the amount of time it takes for the heat detector to heat to the threshold temperature to the threshold amount of time). The threshold amount of time can be, for instance, a baseline amount of time it takes for heat detector 110 (e.g., for a properly functioning heat detector 110) to heat to the threshold temperature while the energy is being provided to the heat detector. This amount of time can, for example, be determined during commissioning, calibration, or other time when it is known heat detector 110 is functioning properly (e.g., is not covered or blocked by debris), and stored in controller 122 (e.g., in the memory of the controller). As an example, this amount of time can be five seconds. However, embodiments of the present disclosure are not so limited.

Controller 122 can determine whether heat detector 110 is functioning properly (e.g., whether heat detector 110 needs maintenance and/or needs to be replaced) based on whether the amount of time it takes for heat detector 110 to heat to the threshold temperature meets or exceeds (e.g., is equal to or greater than) the threshold amount of time. For example, controller 122 can determine heat detector 110 is functioning properly upon determining the amount of time it takes for heat detector 110 to heat to the threshold temperature does not meet or exceed the threshold amount of time, and controller 122 can determine heat detector 110 is not functioning properly upon determining the amount of time it takes for heat detector 110 to heat to the threshold temperature meets or exceeds the threshold amount of time. A conceptual example of such a determination of whether heat detector 110 is functioning properly will be further described herein (e.g., in connection with FIG. 2A).

In some embodiments, controller 122 can also determine whether the air flow through hazard sensing device 100 is functioning properly (e.g., whether the air flow through the hazard sensing device is blocked and/or obstructed) based on whether the amount of time it takes for heat detector 110 to heat to the threshold temperature meets or exceeds the threshold amount of time. For example, controller 122 can determine the air flow through hazard sensing device 100 is functioning properly upon determining the amount of time it takes for heat detector 110 to heat to the threshold temperature does not meet or exceed the threshold amount of time, and controller 122 can determine the air flow through hazard sensing device 100 is not functioning properly upon determining the amount of time it takes for heat detector 110 to heat to the threshold temperature meets or exceeds the threshold amount of time.

Controller 122 can provide a notification upon determining heat detector 110 is not functioning properly, and/or upon determining the air flow through hazard sensing device is not functioning properly (e.g., upon determining the amount of time it takes for heat detector 110 to heat to the threshold temperature meets or exceeds the threshold amount of time). For example, hazard sensing device 100 can include a light (e.g., an LED) for indicating heat detector 110 is not functioning properly and/or a light for indicating the air flow through hazard sensing device 100 is not functioning properly (not shown in FIG. 1 for clarity and so as not to obscure embodiments of the present disclosure), and controller can provide the notification by illuminating the respective light(s).

As an additional example, controller 122 can provide the notification to an additional device, such as, for instance, a mobile device or a computing device of a maintenance engineer, technician, or other user, and/or to a monitoring device of a fire alarm system (e.g., monitoring device 301 further described in connection with FIG. 3). For instance, the notification can be and/or include a report that includes the reason for the notification (e.g., the reason for the failed test). Controller 122 can provide the notification to the additional device by transmitting the notification to the additional device via a network, as will be further described herein (e.g., in connection with FIG. 3).

As an additional example, after heat detector 110 has heated to the threshold temperature, controller 122 can stop providing the energy to heat detector 110 and then determine (e.g., measure) the amount of time it takes for heat detector 110 to cool from the threshold temperature to an additional (e.g., a second, cooler) threshold temperature (e.g., the amount of time it takes for the temperature of heat detector 110 to decrease to the second threshold temperature once energy is no longer being provided to the heat detector). Controller 122 can also use this amount of time to determine whether heat detector 110 is functioning properly (e.g., whether heat detector 110 needs maintenance and/or needs to be replaced).

For example, controller 122 can determine whether the amount of time it takes for heat detector 110 to cool to the second threshold temperature meets or exceeds a threshold amount of time (e.g., by comparing the amount of time it takes for the heat detector to cool to the second threshold temperature to the threshold amount of time). The threshold amount of time can be, for instance, a baseline amount of time it takes for heat detector 110 (e.g., for a properly functioning heat detector 110) to cool from the first threshold temperature to the second threshold temperature after being heated to the first threshold temperature. This amount of time can, for example, be determined during commissioning, calibration, or other time when it is known heat detector 110 is functioning properly (e.g., is not covered or blocked by debris), and stored in controller 122 (e.g., in the memory of the controller).

Controller 122 can determine whether heat detector 110 is functioning properly (e.g., whether heat detector 110 needs maintenance and/or needs to be replaced) based on whether the amount of time it takes for heat detector 110 to cool to the second threshold temperature meets or exceeds the threshold amount of time. For example, controller 122 can determine heat detector 110 is functioning properly upon determining the amount of time it takes for heat detector 110 to cool to the second threshold temperature does not meet or exceed the threshold amount of time, and controller 122 can determine heat detector 110 is not functioning properly upon determining the amount of time it takes for heat detector 110 to cool to the second threshold temperature meets or exceeds the threshold amount of time. A conceptual example of such a determination of whether heat detector 110 is functioning properly will be further described herein (e.g., in connection with FIG. 2B).

In some embodiments, controller 122 can also determine whether the air flow through hazard sensing device 100 is functioning properly (e.g., whether the air flow through the hazard sensing device is blocked and/or obstructed) based on whether the amount of time it takes for heat detector 110 to cool to the second threshold temperature meets or exceeds the threshold amount of time. For example, controller 122 can determine the air flow through hazard sensing device 100 is functioning properly upon determining the amount of time it takes for heat detector 110 to cool to the second threshold temperature does not meet or exceed the threshold amount of time, and controller 122 can determine the air flow through hazard sensing device 100 is not functioning properly upon determining the amount of time it takes for heat detector 110 to cool to the second threshold temperature meets or exceeds the threshold amount of time.

Controller 122 can provide a notification upon determining heat detector 110 is not functioning properly, and/or upon determining the air flow through hazard sensing device is not functioning properly, in a manner analogous to that previously described herein.

Figure 2A:
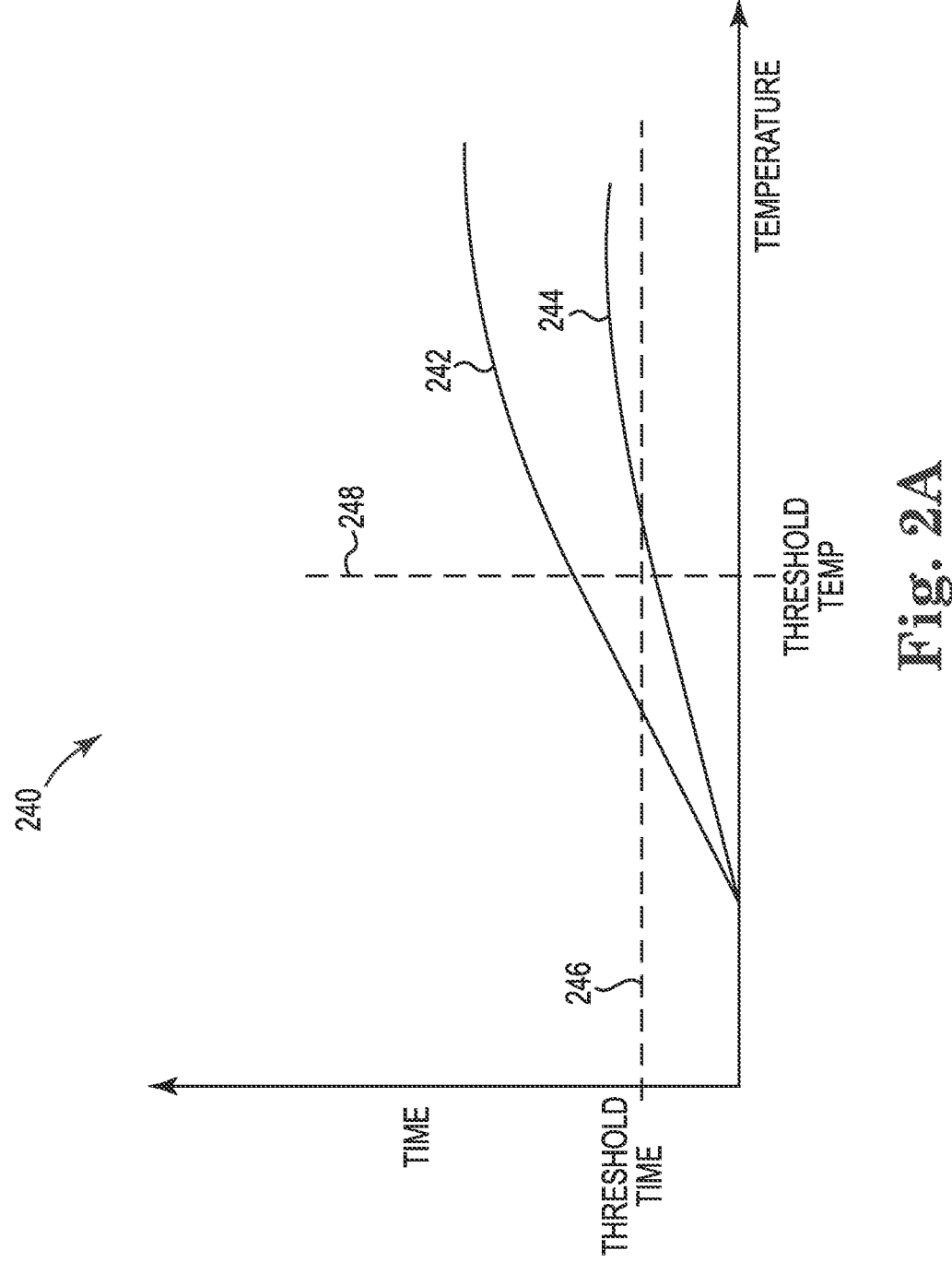
FIGS. 2A-2B are graphs illustrating conceptual examples of testing a heat detector of a self-testing hazard sensing device in accordance with an embodiment of the present disclosure.
Figure 2B:
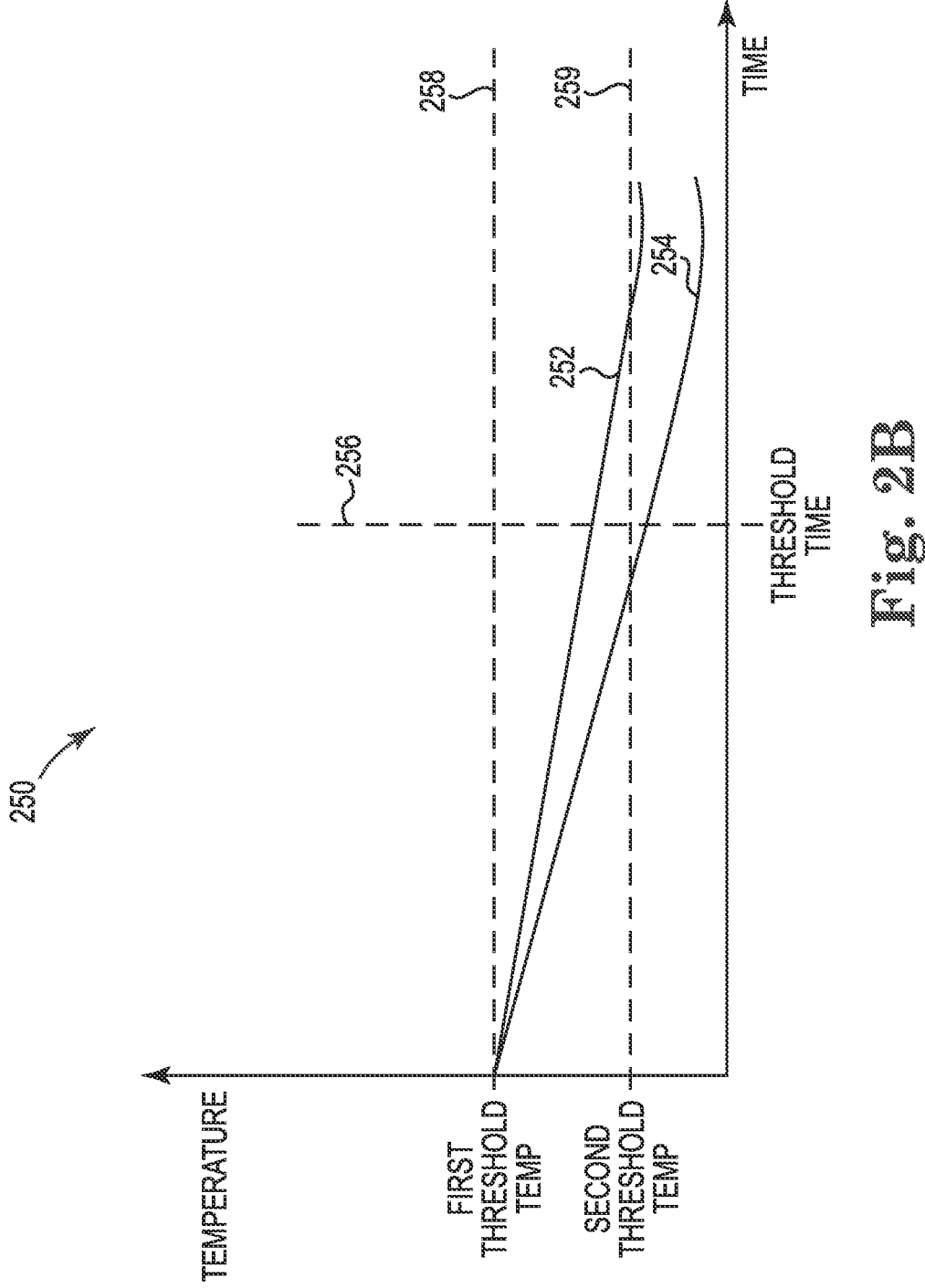

FIGS. 2A-2B are graphs 240 and 250, respectively, illustrating conceptual examples of testing a heat detector of a self-testing hazard sensing device in accordance with an embodiment of the present disclosure. The heat detector can be, for instance, heat detector 110 of self-testing hazard sensing device 100 previously described in connection with FIG. 1.

In the example illustrated in FIG. 2A, curve 242 represents the temperature of a heat detector of a self-testing hazard sensing device that is not functioning properly (e.g. a heat detector that is covered or blocked by debris), and curve 244 represents the temperature of a heat detector of a self-testing hazard sensing device that is functioning properly (e.g., a heat detector that is not covered or blocked by debris). For instance, at an initial time t=0, energy can begin to be provided to the heat detectors, as previously described herein (e.g., in connection with FIG. 1). As shown in FIG. 2A, the temperatures of the respective heat detectors both increase with time as the energy is provided to the heat detectors, but the temperatures do not both increase at the same rate. Rather, the temperature of the heat detector that is functioning properly increases at a faster rate than the temperature of the heat detector that is not functioning properly, as illustrated in FIG. 2A.

For example, the temperature of the heat detector that is functioning properly reaches the threshold temperature 248 illustrated in FIG. 2A in a shorter amount of time than the temperature of the heat detector that is not functioning properly. For instance, the temperature of the heat detector that is functioning properly reaches the threshold temperature 248 before the threshold amount of time 246 illustrated in FIG. 2A has passed, but the temperature of the heat detector that is not functioning properly reaches the threshold temperature 248 after the threshold amount of time 246 has passed. As such, the heat detector whose temperature is represented by curve 242 can be determined to not be functioning properly, and the heat detector whose temperature is represented by curve 244 can be determined to be functioning properly. The threshold temperature 248 can be a temperature sufficient to trigger a fire response from a properly functioning heat detector, and the threshold amount of time 246 can be a baseline amount of time it takes for a properly functioning heat detector to heat to the threshold temperature 248, as previously described herein (e.g., in connection with FIG. 1).

In the example illustrated in FIG. 2B, curve 252 represents the temperature of a heat detector of a self-testing hazard sensing device that is not functioning properly, and curve 254 represents the temperature of a heat detector of a self-testing hazard sensing device that is functioning properly. For instance, at an initial time t=0, both heat detectors have been heated to a first threshold temperature 258, and the energy used to heat the heat detectors to the first threshold temperature 258 has stopped being provided to the heat detectors, as previously described herein (e.g., in connection with FIG. 1). The first threshold temperature 258 can be a temperature sufficient to trigger a fire response from a properly functioning heat detector, as previously described herein (e.g., in connection with FIG. 1). As shown in FIG. 2B, the temperatures of the respective heat detectors both decrease with time after the energy has stopped being provided to the heat detectors, but the temperatures do not both decrease at the same rate. Rather, the temperature of the heat detector that is functioning properly decreases at a faster rate than the temperature of the heat detector that is not functioning properly, as illustrated in FIG. 2B.

For example, the temperature of the heat detector that is functioning properly reaches the second threshold temperature 249 illustrated in FIG. 2B in a shorter amount of time than the temperature of the heat detector that is not functioning properly. For instance, the temperature of the heat detector that is functioning properly reaches the second threshold temperature 249 before the threshold amount of time 256 illustrated in FIG. 2B has passed, but the temperature of the heat detector that is not functioning properly reaches the second threshold temperature 259 after the threshold amount of time 256 has passed. As such, the heat detector whose temperature is represented by curve 252 can be determined to not be functioning properly, and the heat detector whose temperature is represented by curve 254 can be determined to be functioning properly. The second threshold temperature 259 can be a temperature that is lower than the first threshold temperature 258, and the threshold amount of time 256 can be a baseline amount of time it takes for a properly functioning heat detector to cool from the first threshold temperature 258 to the second threshold temperature 259 after being heated to the first threshold temperature 258, as previously described herein (e.g., in connection with FIG. 1).

Figure 3:
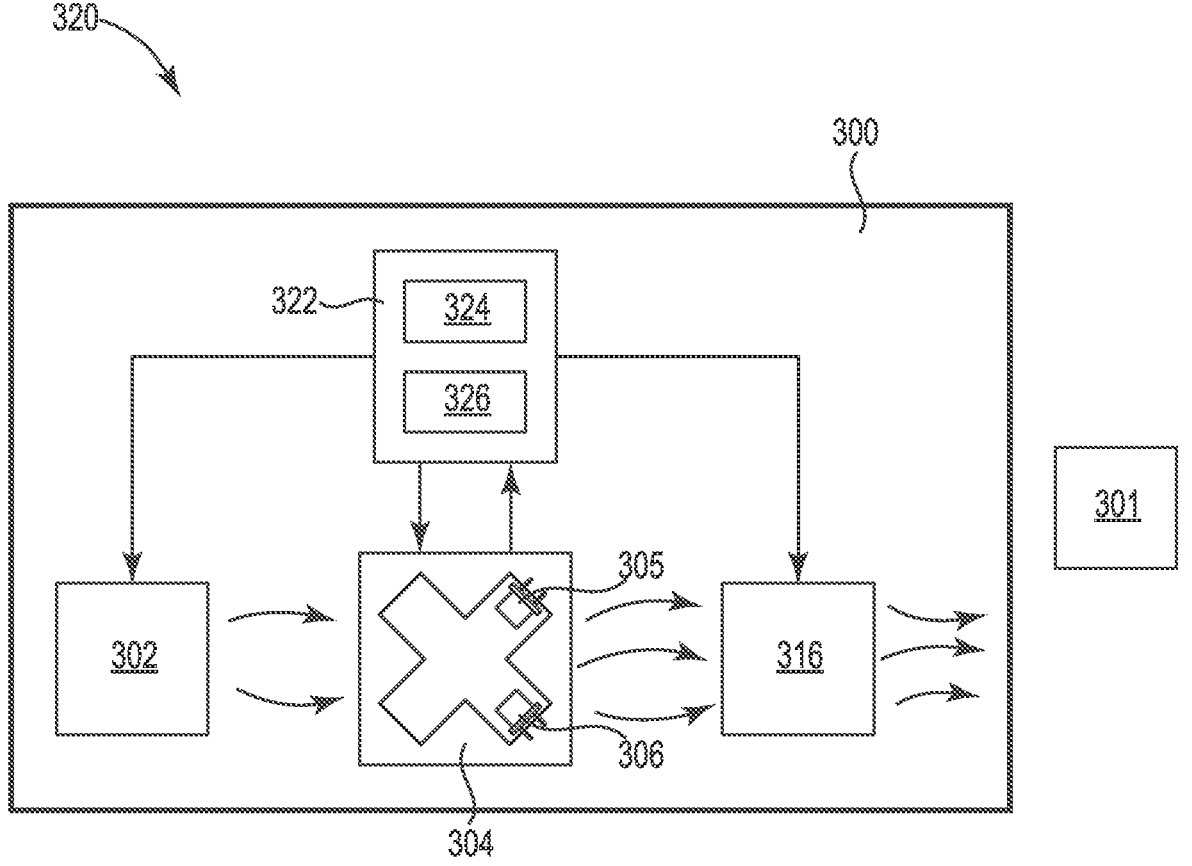
FIG. 3 illustrates a block diagram of a self-test function of a hazard sensing device in accordance with an embodiment of the present disclosure.

FIG. 3 illustrates a block diagram of a self-test function 320 (e.g., smoke self-test function) of a hazard (e.g., fire) sensing device 300 in accordance with an embodiment of the present disclosure. The block diagram of the self-test function 320 includes a fire sensing device 300 and a monitoring device 301. The fire sensing device 300 includes a controller (e.g., microcontroller) 322, a gas and/or smoke generator 302, a sensor 304, and an airflow generator (e.g., variable airflow generator) 316.

Sensor 304 can be a smoke (e.g., particulate) sensor, a carbon monoxide (CO) sensor, or a combination thereof. For example, sensor 304 can be an optical sensor such as optical scatter chamber, a gas sensor, or an ionization sensor, among other types of sensors.

The monitoring device 301 can be a control panel, a fire detection control system, and/or a cloud computing device of a fire alarm system. The monitoring device 301 can be configured to send commands to and/or receive test results from a fire sensing device 300 via a wired or wireless network. The network can be a network relationship through which monitoring device 301 can communicate with the fire sensing device 300. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, the network can include a number of servers that receive information from, and transmit information to, monitoring device 301 and the fire sensing device 300 via a wired or wireless network.

As used herein, a "network" can provide a communication system that directly or indirectly links two or more computers and/or peripheral devices and allows a monitoring device to access data and/or resources on a fire sensing device 300 and vice versa. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get data. Applications may also communicate with network management software, which can interact with network hardware to transmit information between devices on the network.

The microcontroller 322 can include a memory 324 and a processor 326. Memory 324 can be any type of storage medium that can be accessed by processor 326 to perform various examples of the present disclosure. For example, memory 324 can be a non-transitory computer readable medium having computer readable instructions (e.g., computer program instructions) stored thereon that are executable by processor 326 to test a fire sensing device 300 in accordance with the present disclosure. For instance, processor 326 can execute the executable instructions stored in memory 324 to test a heat detector of fire sensing device 300 (e.g., determine whether the heat detector is functioning properly), as previously described herein.

As an additional example, processor 326 can execute the executable instructions stored in memory 324 to generate a particular aerosol density level, measure the generated aerosol density level, determine an airflow rate from an external environment through the sensor 304, and transmit the determined airflow rate. In some examples, memory 324 can store the aerosol density level sufficient to trigger a fire response from a properly firing sensing device, the aerosol density level sufficient to test a fault condition without triggering a fire response, the threshold airflow rate to verify proper airflow through the sensor 304, and/or the particular period of time that has passed since previously conducting a smoke self-test function (e.g., generating a particular aerosol density level and measuring the generated aerosol density level).

As an additional example, processor 326 can execute the executable instructions stored in memory 324 to generate an aerosol density level, measure a rate at which the aerosol density level decreases after the aerosol density level has been generated, compare the measured rate at which the aerosol density level decreases with a baseline rate, and determine whether the fire sensing device 300 is functioning properly (e.g., requires maintenance) based on the comparison of the measured rate and the baseline rate. In some examples, memory 324 can store the baseline rate and/or the measured rate.

The microcontroller 322 can execute the smoke self-test function 320 of the fire sensing device 300 responsive to a particular period of time passing since previously conducting a smoke self-test function and/or responsive to receiving a command from the monitoring device 301. For example, the microcontroller 322 can be used to generate aerosol. The aerosol can be drawn through the sensor 304 via the airflow generator (e.g., fan) 316 creating a controlled aerosol density level. The aerosol density level can be sufficient to trigger a fire response without saturating a sensor. The aerosol density level can be measured and the airflow rate can be determined by the sensor 304. For instance, the aerosol density level can be measured a number of times over a time period, and the rate at which the aerosol density level decreases can be determined based on the measurements of the aerosol density level over the time period. As shown in FIG. 3, the sensor 304 can include a transmitter light-emitting diode (LED) 305 and a receiver photodiode 306 to measure the aerosol density level.

Once the aerosol density level is measured and/or the airflow rate is determined, the fire sensing device 300 can store the test result (e.g., fire response, aerosol density level, rate at which the aerosol density level decreases after the aerosol density level has been generated, and/or airflow rate) in memory 324 and/or send the test result to the monitoring device 301. Further, the measured rate at which the aerosol density level decreases can be stored in memory 324 as a baseline rate if, for example, the measured rate is the first (e.g., initial) measured rate at which the aerosol density level decreases in the fire sensing device 300. If the fire sensing device 300 already has a baseline rate, then the measured rate can be stored in memory 324 as a subsequently measured rate at which the aerosol density level decreases.

In some examples, the fire sensing device 300 (e.g., controller 322) can determine whether the fire sensing device 300 is functioning properly based on the test result and/or the monitoring device 301 can determine whether the fire sensing device 300 is functioning properly based on the test result. For example, the monitoring device 301 can determine the fire sensing device 300 is functioning properly responsive to the triggering of a fire response and/or the airflow rate exceeding a threshold airflow rate.

In some examples, the fire sensing device 300 (e.g., controller 322) and/or monitoring device 301 can determine whether the fire sensing device 300 is functioning properly (e.g., requires maintenance) by comparing the subsequently measured rate at which the aerosol density level decreases with the baseline rate. For example, the fire sensing device 300 may require maintenance when the difference between the measured rate and the baseline rate is greater than a threshold value. The threshold value can be set by a manufacturer, according to regulations, and/or set based on the baseline rate, for example.

As an additional example, processor 326 can execute the executable instructions stored in memory 324 to generate aerosol having a controllable density level, emit a first light that passes through the aerosol, emit a second light that passes through the aerosol, detect a scatter level of the first light that passes through the aerosol, detect a scatter level of the second light that passes through the aerosol, and calibrate a gain of a photodiode based on the detected scatter level of the first light, the detected scatter level of the second light, and the controllable aerosol density level. In some examples, memory 324 can store the detected scatter level of the first light and/or the detected scatter level of the second light.

For example, the microcontroller 322 can provide a current to a wire of the gas and/or smoke generator 302 to generate aerosol, as previously described herein. The aerosol can be drawn through the sensor 304 via the airflow generator (e.g., fan) 316 creating a controlled aerosol density level. The sensor 304 can include an additional transmitter LED (not shown in FIG. 3) opposite photodiode 306, and an additional photodiode (not shown in FIG. 3) opposite transmitter LED 305, and transmitter LED 305, photodiode 306, the additional transmitter LED, and the additional photodiode can measure the aerosol density level by detecting scatter levels. Scatter can be light from the transmitter LEDs reflecting, refracting, and/or diffracting off of particles and can be received by the photodiodes. The amount of light received by the photodiodes can be used to determine the aerosol density level. For instance, transmitter LED 305 can emit a first light and the additional transmitter LED can emit a second light. The additional photodiode can detect a scatter level of the first light and/or the second light and photodiode 306 can detect a scatter level of the first light and/or the second light.

In a number of embodiments, a fault (e.g., an error) can be triggered responsive to the detected scatter level. For example, the controller 322 can compare the detected scatter level to a threshold scatter level and trigger a fault responsive to the detected scatter level being below the threshold scatter level. Another example can include the controller 322 comparing the detected scatter level to a previously detected scatter level and triggering a fault responsive to the detected scatter level being less than the previously detected scatter level.

Each amplifier gain can be calibrated by storing the initial detected scatter level and each amplifier gain in memory 324. Over time LED emission levels of the transmitter LEDs can decrease, reducing the received light by the photodiodes, which could lead to the fire sensing device 300 malfunctioning.

The amplifier gain used by the photodiodes for detecting scatter levels can be recalibrated as the transmitter LEDs degrade over time. Controller 322 can recalibrate the gain responsive to the detected scatter level. For example, the controller 322 can initiate a recalibration of the gain responsive to comparing the detected scatter level to a threshold scatter level and determining the detected scatter level is below the threshold scatter level. In some examples, the controller 322 can recalibrate the gain responsive to determining a difference between the detected scatter level and the initial detected scatter level is greater than a threshold value and/or responsive to determining the detected scatter level is less than a previously detected scatter level.

Figure 4:
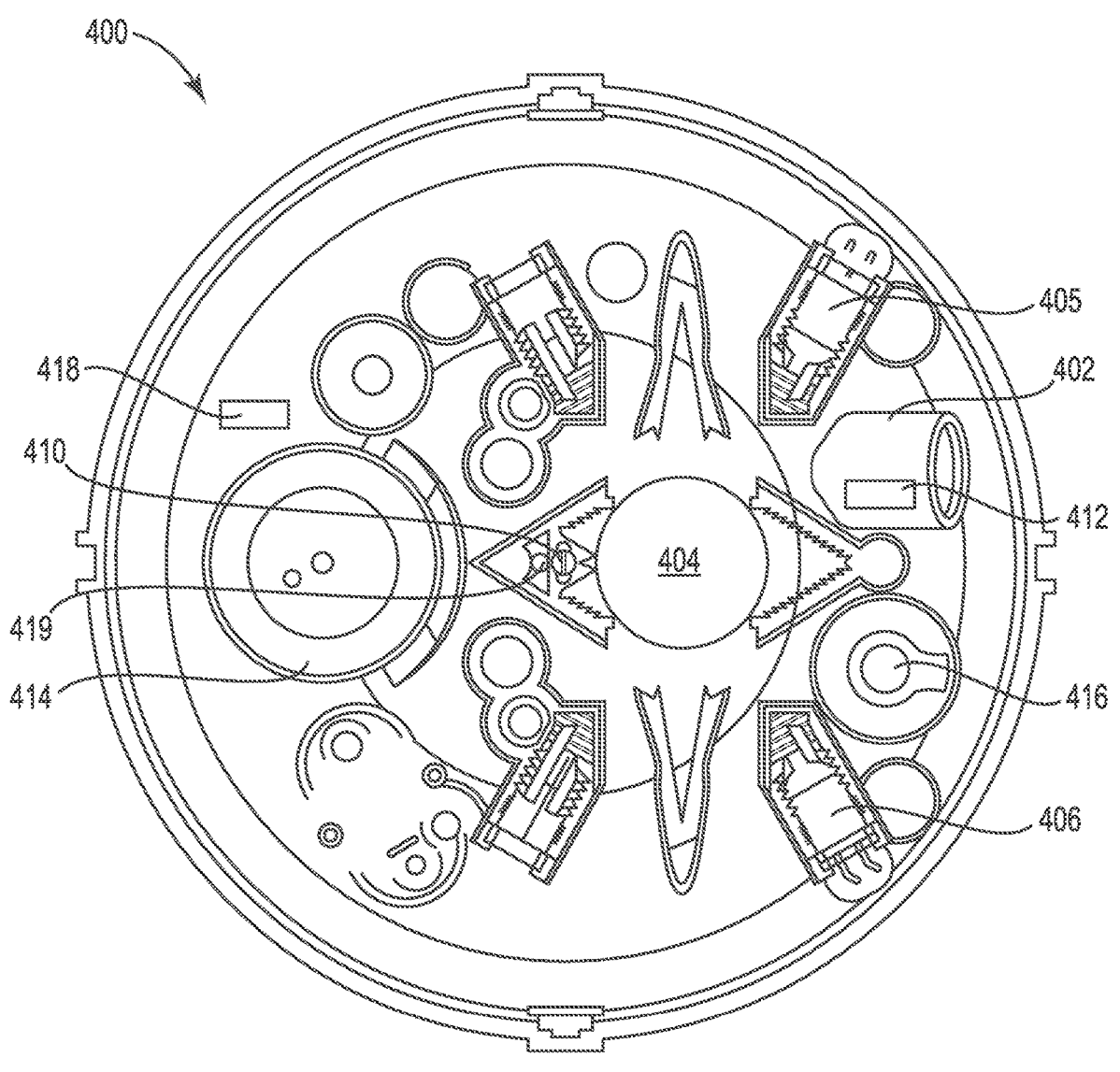
FIG. 4 illustrates an example of a self-testing hazard sensing device in accordance with an embodiment of the present disclosure.

FIG. 4 illustrates an example of a self-testing hazard (e.g., fire) sensing device 400 in accordance with an embodiment of the present disclosure. The self-testing fire sensing device 400 can be, but is not limited to, a fire and/or smoke detector of a fire control system.

A fire sensing device 400 (e.g., smoke detector) can sense a fire occurring in a facility and trigger a fire response to provide a notification of the fire to occupants of the facility. A fire response can include visual and/or audio alarms, for example. A fire response can also notify emergency services (e.g., fire departments, police departments, etc.) In some examples, a plurality of fire sensing devices can be located throughout a facility (e.g., on different floors and/or in different rooms of the facility).

A self-testing fire sensing device 400 can automatically or upon command conduct one or more tests contained within the fire sensing device 400. The one or more tests can determine whether the self-testing fire sensing device 400 is functioning properly, as previously described herein.

As shown in FIG. 4, fire sensing device 400 can include a gas and/or smoke generator 402, a sensor 404 including a transmitter light-emitting diode (LED) 405 and a receiver photodiode 406, a heat sensor 410, a gas source 412, a gas sensor 414, an airflow generator (e.g., variable airflow generator) 416, a proximity sensor 418, and a heat source 419. In some examples, a fire sensing device 400 can also include a microcontroller including memory and/or a processor, and/or an additional transmitter LED and receiver photodiode, as previously described herein (e.g., in connection with FIG. 3).

Sensor 404 can be a smoke (e.g., particulate) sensor, a carbon monoxide (CO) sensor, or a combination thereof. For example, sensor 404 can be an optical sensor such as optical scatter chamber, a gas sensor, or an ionization sensor, among other types of sensors.

The gas and/or smoke generator 402 of the fire sensing device 400 can generate aerosol which can be mixed into a controlled aerosol density level by the airflow generator 416, as previously described herein. The aerosol density level can be a particular level that can be detected by sensor 404. Once the aerosol density level has reached the particular level, the gas and/or smoke generator 402 can be turned off and the airflow generator 416 can increase the rate of airflow through the sensor 404. The airflow generator 416 can increase the rate of airflow through the sensor 404 to reduce the aerosol density level back to an initial level of the sensor 404 prior to the gas and/or smoke generator 402 generating aerosol. For example, the airflow generator 416 can remove the aerosol from the sensor 404 after it is determined whether the fire sensing device 400 is functioning properly (e.g., after the rate in reduction of aerosol density is determined or after the scatter levels described herein are detected). If the fire sensing device 400 is not blocked or covered, then airflow from the external environment through the sensor 404 will cause the aerosol density level to decrease. The rate at which the aerosol density level decreases after the aerosol density level has been generated is proportional to airflow from the external environment through the sensor 404, so the sensor 404 can measure the airflow to determine whether the sensing device 400 is impeded and whether the sensing device 400 is functioning properly.

The gas and/or smoke generator 402 can be used to generate aerosol to, for instance, create airborne particles to simulate smoke from a fire. The particles can measure approximately 1 micrometer in diameter and/or the particles can be within the sensitivity range of the sensor 404. Generator 402 generate an aerosol density level sufficient to trigger a fire response from a properly functioning fire sensing device without saturating the sensor 404 and/or generate an aerosol density level sufficient to test a fault condition without triggering a fire response or saturating the sensor 404. The ability to control the aerosol density level can allow a smoke test to more accurately mimic the characteristics of a fire and prevent the sensor 404 from becoming saturated.

The sensor 404 can sense the external environment due to a baffle opening in the fire sensing device 400 that allows air and/or smoke from a fire to flow through the fire sensing device 400. The sensor 404 can be an example of an airflow monitoring device, and can measure the aerosol density level. In some examples a different airflow monitoring device can be used to measure the airflow through the fire sensing device 400.

As previously discussed, the rate of reduction in aerosol density level can be used to determine an airflow rate from the external environment through the sensor 404, and a determination of whether fire sensing device 400 is functioning properly can be made based on the determined air flow rate and/or the fire response. For example, the fire sensing device 400 can be determined to be functioning properly responsive to the airflow rate exceeding a threshold airflow rate and/or a fire response being triggered. As an additional example, the fire sensing device can be determined to require maintenance responsive to a difference between the measured airflow rate and a baseline rate being greater than a threshold value.

In some examples, the fire sensing device 400 can trigger a fault if the airflow rate fails to exceed a threshold airflow rate. For example, the fire sensing device 400 can send a notification of the fault to a monitoring device when an impeded airflow is detected. In some examples, the impeded airflow can be caused by a person deliberately attempting to mask (e.g., cover) the fire sensing device 400.

Further, as previously discussed, the detected scatter levels from the test can be used to determine whether fire sensing device 400 requires maintenance and/or recalibration. For example, the fire sensing device 400 can be determined to require maintenance and/or recalibration responsive to a calculated sensitivity, calculated using the detected scatter level and the known aerosol density level, being outside a sensitivity range.

In some examples, the fire sensing device 400 can generate a message if the device requires maintenance (e.g., if the difference between the measured airflow rate and the baseline rate is greater than the threshold value, or the calculated sensitivity is outside the sensitivity range). The fire sensing device 400 can send the message to a monitoring device and/or a mobile device, for example. As an additional example, the fire sensing device 400 can include a user interface that can display the message.

The fire sensing device 400 of FIG. 4 illustrates transmitter LED 405 and photodiode 406. Transmitter LED 405 can emit a first light and a second light. In some examples, the first light can have a first wavelength and the second light can have a second wavelength. For example, transmitter LED 405 can include an infrared (IR) LED with a first wavelength and a blue LED with a second wavelength. Having two or more different wavelengths can help the fire sensing device 400 detect various types of smoke. For example, a first wavelength can better detect a flaming fire including black aerosol and a second wavelength can better detect water vapor including white non-fire aerosol. In some examples, a ratio of the first wavelength and the second wavelength can be used to indicate the type of smoke. Photodiode 406 can receive a scatter of the first light and/or the second light from transmitter LED 405. Photodiode 406 can detect a scatter level of the first light and/or a scatter level of the second light. In a number of embodiments, photodiode 406 can be a transmitter LED.

In an additional example, the fire sensing device 400 may include an additional transmitter LED opposite transmitter LED 405. Transmitter LED 405 can emit a first light and the additional transmitter LED can emit a second light. Transmitter LED 405 and/or the additional transmitter LED can be located at particular angles from photodiode 406 to detect various types of smoke. For example, transmitter LED 405 can be located approximately 120 degrees from photodiode 406 and the additional transmitter LED can be located approximately 60 degrees from photodiode 406. Photodiode 406 can receive the first light from transmitter LED 405 and/or the second light from the additional transmitter LED, and can detect a scatter level of the first light and/or a scatter level of the second light.

The fire sensing device 400 can include a heat source 419, but may not require a heat source 419 if the heat sensor 410 is self-heated. Heat source 419 can be, for example, current source 119 previously described in connection with FIG. 1. In some examples, heat source 419 can generate heat at a temperature sufficient to trigger a fire response from a properly functioning heat sensor 410. The heat source 419 can be turned on to generate heat during a heat self-test. Once the heat self-test is complete, the heat source 419 can be turned off to stop generating heat.

The heat sensor 410 can normally be used to detect a rise in temperature caused by a fire. Once the heat source 419 is turned off, the heat sensor 410 can measure a rate of reduction in temperature. The rate of reduction in temperature can be proportional to the airflow from the external environment through the fire sensing device 400 and as such the rate of reduction in temperature can be used to determine the airflow rate. The airflow rate can be used to determine whether air is able to enter the fire sensing device 400 and reach the heat sensor 410. The airflow rate can also be measured and used to compensate the generation of an aerosol used to self-test the fire sensing device 400. Further, the rate in reduction in temperature can be used to determine whether the fire sensing device 400 is functioning properly (e.g., requires maintenance) and/or whether the fire sensing device 400 is dirty. For instance, the maintenance can include cleaning the fire sensing device 400 so that clean air is able to enter the device and reach the heat sensor 410.

A fire response can be triggered responsive to the heat sensor 410 detecting a temperature exceeding a threshold temperature. The fire sensing device 400 can be determined to be functioning properly responsive to the triggering of the fire response and the determined airflow rate.

A fault can be triggered by the fire sensing device 400 responsive to a determined change in temperature over time failing to exceed a threshold temperature change over time. In some examples, the fault can be sent to a monitoring device. The determined change in temperature over time can determine whether the fire sensing device 400 is functioning properly. In some examples, the fire sensing device 400 can be determined to be functioning properly responsive to an airflow rate derived from the determined change in temperature over time exceeding a threshold airflow rate.

A gas source 412 can be separate and/or included in the gas and/or smoke generator 402, as shown in FIG. 4. The gas source 412 can be configured to release one or more gases. The one or more gases can be produced by combustion. In some examples, the one or more gases can be carbon monoxide (CO) and/or a cross-sensitive gas. The gas source 412 can generate gas at a gas level sufficient to trigger a fire response from a properly functioning fire sensing device and/or trigger a fault in a properly functioning gas sensor 414.

The gas sensor 414 can detect one or more gases in the fire sensing device 400, such as, for example, the one or more gases released by the gas source 412. For example, the gas sensor 414 can detect CO and/or cross-sensitive gases. In some examples, the gas sensor 414 can be a CO detector. Once the gas source 412 is turned off, the gas sensor 414 can measure the gas level and determine the change in gas level over time (e.g., rate of reduction in gas level) to determine the airflow rate. The airflow rate can be used to determine whether air is able to enter the fire sensing device 400 and reach the gas sensor 414, and hence whether fire sensing device 400 is functioning properly and/or is dirty (e.g., requires cleaning).

A fire response of the fire sensing device 400 can be triggered responsive to the gas sensor 414 detecting one or more gases and/or one or more gases exceeding a threshold level. The fire sensing device 400 can be determined to be functioning properly responsive to the fire response, the gas sensor 414 detecting the one or more gases and/or the one or more gases exceeding the threshold level and the fire sensing device 400 properly triggering a fire response.

The fire sensing device 400 can be determined to be functioning properly based on the change in the gas level over time. In some examples, the fire sensing device 400 can be determined to be functioning properly responsive to the change in the gas level over time exceeding a threshold gas level change and/or a threshold airflow rate, derived from the determined change in gas level over time, exceeding a threshold airflow rate. The fire sensing device 400 can trigger and/or send a fault responsive to the change in gas level over time failing to exceed the threshold change in gas level and/or the airflow rate failing to exceed the threshold airflow rate. In some examples, the fire sensing device 400 can be determined to be functioning properly responsive to the triggering of a fire response and/or triggering of a fault.

The airflow generator 416 can control the airflow through the fire sensing device 400, including the sensor 404. For example, the airflow generator 416 can move gases and/or aerosol from a first end of the fire sensing device 400 to a second end of the fire sensing device 400. In some examples, the airflow generator 416 can be a fan. The airflow generator 416 can start responsive to the gas and/or smoke generator 402, the heat source 419, and/or the gas source 412 starting. The airflow generator 416 can stop responsive to the gas and/or smoke generator 402, the heat source 419, and/or the gas source 412 stopping, and/or the airflow generator 416 can stop after a particular period of time after the gas and/or smoke generator 402, the heat source 419, and/or the gas source 412 has stopped.

The fire sensing device 400 can include one or more proximity sensors 418. A proximity sensor 418 can detect objects within a particular distance of the fire sensing device 400, and therefore can be used to detect tampering intended to prevent fire sensing device 400 from functioning properly. For example, the proximity sensor 418 can detect an object (e.g., a hand, a piece of clothing, etc.) placed in front of or on the fire sensing device 400 to impede heat, gas, and/or smoke from entering the sensor 404 in an attempt to prevent the triggering of a fire response from the fire sensing device 400. In some examples, a fire response of the fire sensing device 400 can be triggered responsive to the proximity sensor 418 detecting an object within a particular distance of the fire sensing device 400.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:
1. A self-testing hazard sensing device, comprising:
a heat detector; and
a controller having a memory and processor to:
    provide energy to the heat detector using a current source that is external to the self-testing hazard sensing device to heat the heat detector to a threshold temperature, wherein the current source that is external to the self-testing hazard sensing device is wiring of a facility in which the self-testing hazard sensing device is installed;
    determine an amount of time it takes for the heat detector to heat to the threshold temperature;

determine whether the amount of time it takes for the heat detector to heat to the threshold temperature meets or exceeds a threshold amount of time;

determine, after the heat detector has heated to the threshold temperature, an amount of time it takes for the heat detector to cool from the threshold temperature to an additional threshold temperature;

determine whether the amount of time it takes for the heat detector to cool from the threshold temperature to the additional threshold temperature meets or exceeds an additional threshold amount of time;

determine whether the heat detector is functioning properly based on whether the amount of time it takes for the heat detector to heat to the threshold temperature meets or exceeds the threshold amount of time and whether the amount of time it takes for the heat detector to cool from the threshold temperature to the additional threshold temperature meets or exceeds the additional threshold amount of time; and determine whether air flow through the self-testing hazard sensing device is functioning properly based on whether the amount of time it takes for the heat detector to heat to the threshold temperature meets or exceeds the threshold amount of time and whether the amount of time it takes for the heat detector to cool from the threshold temperature to the additional threshold temperature meets or exceeds the additional threshold amount of time.

2. The self-testing hazard sensing device of claim 1, wherein the heat detector comprises a thermistor.

3. The self-testing hazard sensing device of claim 1, wherein the threshold amount of time is a baseline amount of time it takes for the heat detector to heat to the threshold temperature while the energy is provided to the heat detector.

4. The self-testing hazard sensing device of claim 1, wherein the memory and processor of the controller is to provide a notification upon determining the heat detector is not functioning properly.

5. The self-testing hazard sensing device of claim 4, wherein the memory and processor of the controller is to provide the notification by illuminating a light of the self-testing hazard sensing device.

6. The self-testing hazard sensing device of claim 4, wherein the memory and processor of the controller is to provide the notification by transmitting the notification to an additional device.

7. A method of operating a self-testing hazard sensing device, comprising:

providing, by a controller having a memory and processor, energy to a heat detector of the self-testing hazard sensing device using a current source that is external to the self-testing hazard sensing device to heat the heat detector to a threshold temperature, wherein the current source that is external to the self-testing hazard sensing device is wiring of a facility in which the self-testing hazard sensing device is installed;

determining, by the controller, an amount of time it takes for the heat detector to heat to the threshold temperature;

determining, by the controller whether the amount of time it takes for the heat detector to heat to the threshold temperature meets or exceeds a threshold amount of time;

determining, by the controller after the heat detector has heated to the threshold temperature, an amount of time it takes for the heat detector to cool from the threshold temperature to an additional threshold temperature;

determining, by the controller, whether the amount of time it takes for the heat detector to cool from the threshold temperature to the additional threshold temperature meets or exceeds an additional threshold amount of time;

determining, by the controller, whether the heat detector is functioning properly based on whether the amount of time it takes for the heat detector to heat to the threshold temperature meets or exceeds the threshold amount of time and whether the amount of time it takes for the heat detector to cool from the threshold temperature to the additional threshold temperature meets or exceeds the additional threshold amount of time; and determining, by the controller, whether air flow through the self-testing hazard sensing device is functioning properly based on whether the amount of time it takes for the heat detector to heat to the threshold temperature meets or exceeds the threshold amount of time and whether the amount of time it takes for the heat detector to cool from the threshold temperature to the additional threshold temperature meets or exceeds the additional threshold amount of time.

8. The method of claim 7, wherein the method includes determining the heat detector is functioning properly upon determining the amount of time it takes for the heat detector to heat to the threshold temperature does not meet or exceed the threshold amount of time.

9. The method of claim 7, wherein the method includes determining the heat detector is not functioning properly upon determining the amount of time it takes for the heat detector to heat to the threshold temperature meets or exceeds the threshold amount of time.

10. The method of claim 7, wherein the method includes determining whether the amount of time it takes for the heat detector to heat to the threshold temperature meets or exceeds the threshold amount of time by comparing the amount of time it takes for the heat detector to heat to the threshold temperature to the threshold amount of time.

11. The method of claim 7, wherein the method includes determining whether to replace the heat detector based on whether the amount of time it takes for the heat detector to heat to the threshold temperature meets or exceeds the threshold amount of time.

12. A self-testing hazard sensing device, comprising:

a heat detector; and a controller having a memory and processor to:

provide energy to the heat detector using a current source that is external to the self-testing hazard sensing device to heat the heat detector to a first threshold temperature, wherein the current source that is external to the self-testing hazard sensing device is wiring of a facility in which the self-testing hazard sensing device is installed;

determine, after the heat detector has heated to the first threshold temperature, an amount of time it takes for the heat detector to cool from the first threshold temperature to a second threshold temperature;

determine whether the amount of time it takes for the heat detector to cool to the second threshold temperature meets or exceeds a threshold amount of time;

determine whether the heat detector is functioning properly based on whether the amount of time it takes for the heat detector to cool to the second threshold temperature meets or exceeds the threshold amount of time; and determine whether air flow through the self-testing hazard sensing device is functioning properly based on whether the amount of time it takes for the heat detector to cool to the second threshold temperature meets or exceeds the threshold amount of time.

13. The self-testing hazard sensing device of claim 12, wherein the memory and processor of the controller is to determine the heat detector is functioning properly upon determining the amount of time it takes for the heat detector to cool to the second threshold temperature does not meet or exceed the threshold amount of time.

14. The self-testing hazard sensing device of claim 12, wherein the memory and processor of the controller is to determine the heat detector is not functioning properly upon determining the amount of time it takes for the heat detector to cool to the second threshold temperature meets or exceeds the threshold amount of time.

15. The self-testing hazard sensing device of claim 12, wherein the threshold amount of time is a baseline amount of time it takes for the heat detector to cool from the first threshold temperature to the second threshold temperature after the heat detector has heated to the first threshold temperature.

\* \* \* \* \*